April 8, 1930.  O. GLÄSSER ET AL  1,753,827
TUBE CUTTING MACHINE
Filed Nov. 30, 1927  2 Sheets-Sheet 1
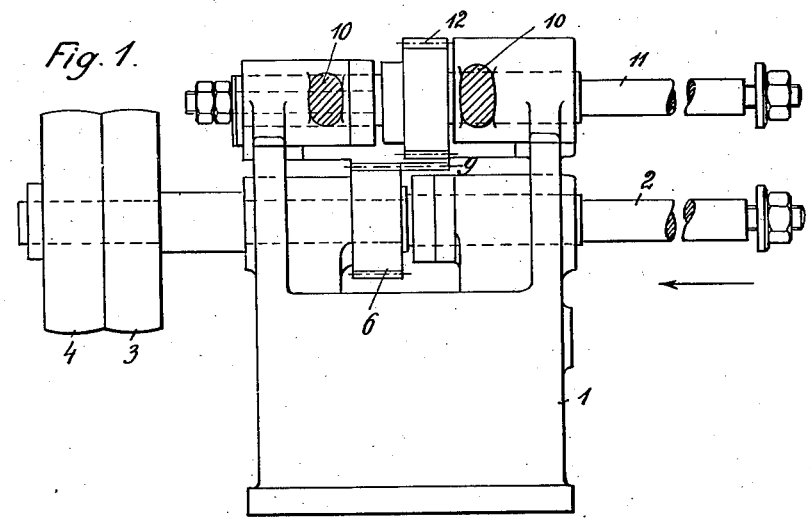
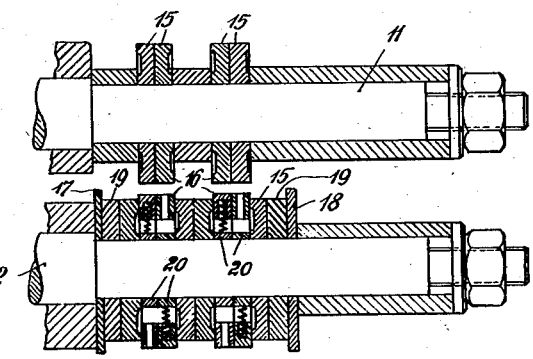
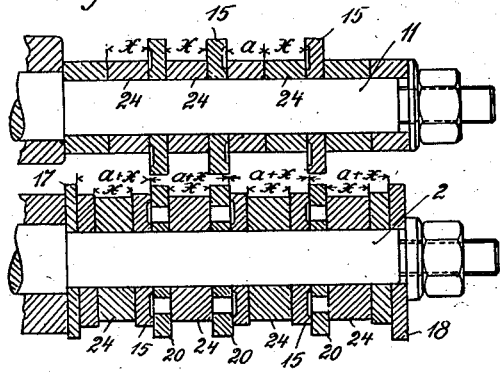
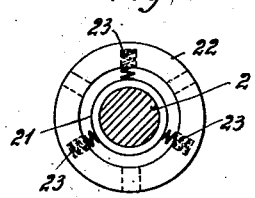
Inventors:
Otto Glässer and
Ernst Flemnitz
by
Atty.

April 8, 1930.  O. GLÄSSER ET AL  1,753,827
TUBE CUTTING MACHINE
Filed Nov. 30, 1927  2 Sheets-Sheet 2
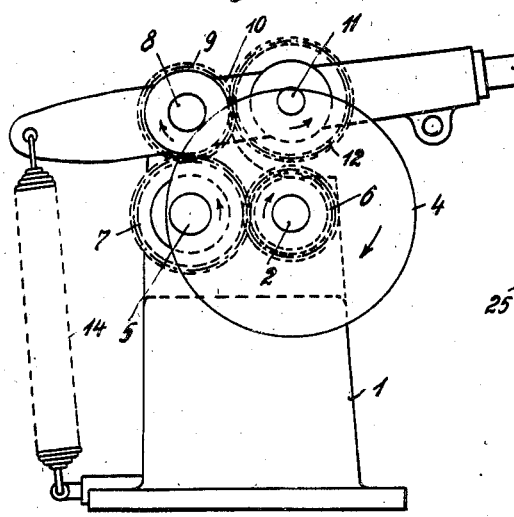
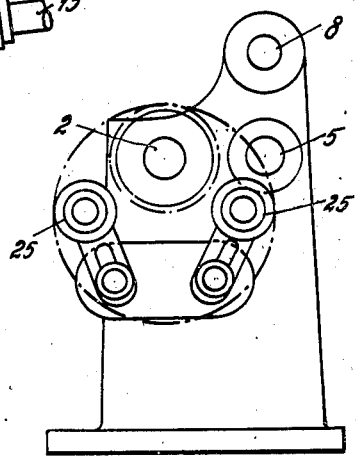
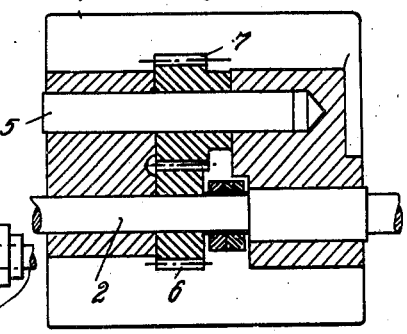
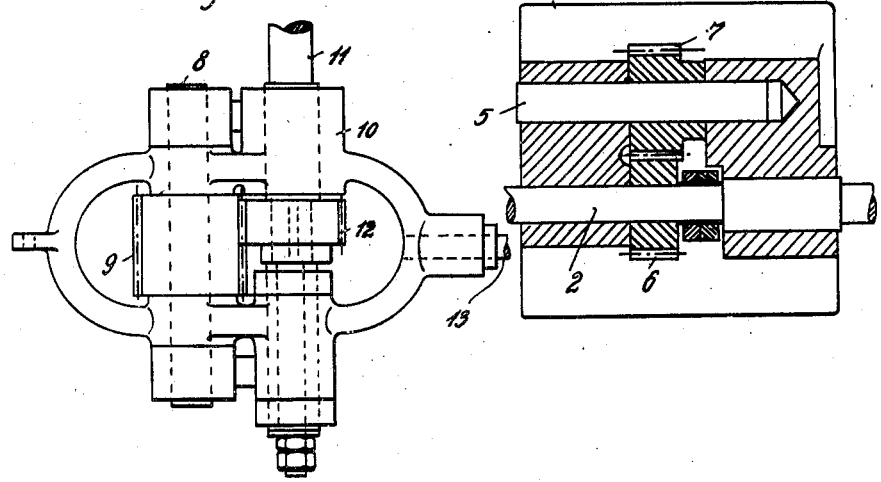
Inventors:
Otto Glässer and
Ernst Flemnitz
by
Atty.

Patented Apr. 8, 1930

1,753,827

UNITED STATES PATENT OFFICE

OTTO GLÄSSER AND ERNST FLEMNITZ, OF LUBECK, GERMANY, ASSIGNORS TO THE FIRM: L. SCHULER A.-G. WERKZEUGMASCHINENFABRIK, OF GOPPINGEN, WURTTEMBERG, GERMANY

TUBE-CUTTING MACHINE

Application filed November 30, 1927, Serial No. 236,703, and in Germany December 1, 1926.

The present invention relates to a cutting machine for the production of container bodies and has for its object to permit of a more rapid and cheaper production of the container bodies. Hitherto the production of the container bodies was effected in such a manner that a strip of sheet metal of the depth of the container to be produced was bent to the required cross section and then the longitudinal seam of the container body was produced by securing together the two ends of the strip of sheet metal on a soldering machine, by welding or the like. This method, particularly when dealing for example with containers of small depth as used almost exclusively in the fish industry, is very tedious and expensive as the production of such small longitudinal seams on a soldering machine is very tedious. These disadvantages are eliminated in that according to the present invention a strip of sheet metal a number of times the width of the containers required is bent to the desired cross section and then the longitudinal seam for a number of container bodies is produced simultaneously by soldering together the two ends of the strip of sheet metal on a soldering machine or by welding or the like, whereupon the sheet metal cylinder produced is cut in a separate device with lever pressure into the corresponding number of container bodies of the required height. The machine used for this purpose consists mainly of a cutter shaft rotatably mounted about a fixed axis and an oscillatory cutter shaft, the rotary shaft supporting the cylinder to be cut and which is still held by guide rollers, whilst the oscillatory cutter shaft is pressed downwardly by means of a hand lever or automatically against the rotary cutter shaft, whereby the sheet metal cylinder is cut by the shear like action of the cutters of the two cutter shafts.

In the drawing is illustrated one example of construction of a machine embodying our invention.

Fig. 1 is an elevation of the machine.

Fig. 2 is a side elevation.

Fig. 3 is a side elevation looking in the direction of the arrow in Fig. 1.

Fig. 4 is a top plan view.

Fig. 5 is a section on the line A—B of Fig. 1, and

Figs. 6 to 8 show details of the two cutter shafts.

The machine is equipped with a frame 1 in which a cutter shaft 2 is rotatably mounted. The cutter shaft 2 is driven by a belt drive through the medium of a fixed pulley 3 and a loose pulley 4 mounted on the shaft 2. Adjacent the shaft 2 is mounted a second shaft 5 which is driven from the shaft 2 by means of two spur wheels 6 and 7. Above the shaft 5 is rotatably mounted a third shaft 8 which is driven by a toothed wheel 9 gearing with the toothed wheel 7 on the shaft 5. On the shaft 8 is mounted a lever 10 which can be rocked about the central axis of the shaft 8, which lever carries a second cutter shaft 11, the shaft 11 being driven by the interengagement of a toothed wheel 12 mounted thereon with the toothed wheel 9 on the shaft 8. The cutter shafts 2 and 11 are extended beyond the machine frame 1 and on their extended ends carry cutters which serve to cut the sheet metal cylinder. The lever 10 is provided with a hand-piece 13 by means of which the lever 10 can be pressed downwardly so as to bring the cutters of the two cutter shafts 2 and 11 into operation. By means of a tension spring 14 provided at the other end of the lever 10, the lever 10, after releasing the hand-piece 13, is again swung back into its open position thus bringing the cutters out of engagement.

The cutters are so arranged on the cutter shafts 2 and 11 that container bodies of any height between a predetermined minimum up to a predetermined maximum can be cut simultaneously from a sheet metal cylinder having a longitudinal seam and of which the height is a multiple of the container height required. The cutters are in the form of circular discs 15, each of which is provided with a cutting edge 16, the corresponding cutting edges 16 of the adjacent cutters cooperate in the manner of shears. On the lower cutter shaft 2, which during the cutting operation carries the sheet metal cylinder to be cut, are provided two limiting discs 17 and 18 which are disposed at such a distance apart that the sheet metal cylinder to be cut fits accurately between them. In Fig. 6 the arrangement of the cutter is shown by way of example for the smallest depth of body $a$ to be produced by the machine. The cutter discs 15 always have a width equal to half the height of the smallest body so that two cutting edges turned away from one another of adjacent cutter discs 15 produce the smallest body height $a$. Adjacent the two limiting discs 17 and 18 there is only provided a simple disc 19 as the ends of the sheet metal cylinder are located here and no cutting is to be effected. Between each two cutter discs 15 are arranged two spring actuated discs of which the width is equal to that of the cutter discs 15 so that two spring actuated discs also form the smallest body height $a$. The spring actuated discs 20 each consist of two rings (21 and 22) fitted concentrically one within the other, of which the inner ring 21 is seated directly on the cutter shaft 2 whilst the outer ring 22 is arranged, so as to be radially movable by means of springs 23, on the ring 21. In this manner the distance between the two limiting discs 17 and 18 on the lower cutter shaft 2 is divided in Fig. 6 into five parts so that 5 container bodies can be produced simultaneously. On the upper cutter shaft 11 cutter discs 15 are so arranged that a cutter disc 15 will always be opposite a spring actuated disc 20 whilst the required spacing between the pairs of cutters is produced by means of simple distance rings. With the arrangement of the cutters according to Fig. 7 four container bodies of the height $a+x$ can be produced simultaneously. In this case there are arranged on the lower cutter shaft 2 between each two cutter discs 15 and each two spring actuated discs 20 distance rings 24 of the width $x$; on the upper cutter shaft 11 distance rings of the width $x$ are also provided in such a manner that each cutter disc 15 will be opposite a spring actuated ring 20 of the lower cutter shaft and the cutting edges 16 of the cutter discs 15 of the upper shaft 11 cooperate in the manner of shears with the cutting edges 16 of the cutter discs 15 of the lower shaft 2.

In this manner containers of any height may be produced, distance rings being inserted of which the width corresponds to the difference $x$ between the smallest possible container height $a$ and the desired height $a+x$.

For holding and for guiding the sheet metal cylinder guide rollers 25 are provided in the machine frame 1, these rollers being adjustable in height and in a radial direction according to the diameter of the cylinders to be cut, and bear intimately against the cylinder along its whole length and support and guide it substantially at the level of the horizontal central plane.

It will be understood that the operation of the lever 10, which in the example of construction described is effected by hand, may also be effected automatically.

By reason of the spring actuated discs 20 the separate container bodies are immediately released after being cut and can be removed readily from the lower shaft 2 by means of a rod or the like by the person attending to the machine or automatically by the machine itself, which is particularly of importance when the lever 10 is actuated automatically as then only a short space of time is available for removing the cut container bodies and for placing a fresh sheet metal cylinder in position.

In order to simplify the operation of the machine it may be brought into direct combination with the device for the production of the longitudinal seam and the cylinders which are produced can be conveyed automatically by a suitable automatic conveyer to the cutting machine.

We wish it to be understood that we do not desire to be limited to the exact details of construction shown and described for obvious modifications will occur to a person skilled in the art.

We claim:—

1. A tube-cutting machine comprising a frame, a driving shaft in said frame, a rocking carrier fulcrumed on said frame, a shaft supported on said carrier, one of said shafts being adapted to support a tube blank, means on said shafts for operatively connecting said shafts in a given position of said carrier with respect to said driving shaft, a cutter on one of said shafts, a cutter on the other shaft so arranged with respect to said first-mentioned cutter that the cutting edges of both cutters are registering, and an annular resilient pad on said blank-supporting shaft adapted to be engaged by the cutter on the other shaft.

2. A tube-cutting machine comprising a frame, a driving shaft in said frame, a rocking carrier fulcrumed on said frame, a shaft supported on said carrier, one of said shafts being adapted to support a tube blank, means on said shafts for operatively connecting said shafts in a given position of said carrier with respect to said driving shaft, a cutter on one of said shafts, a cutter on the other shaft so arranged with respect to said first-mentioned cutter that the cutting edges of both cutters are registering, an annular resilient pad on said blank-supporting shaft adapted to be engaged by the cutter on the other shaft, and shrouds on said blank-supporting shaft for holding the blank between them.

3. A tube-cutting machine comprising a frame, a driving shaft in said frame, a rocking carrier fulcrumed on said frame, a shaft supported on said carrier, one of said shafts being adapted to support a tube blank, means on said shafts for operatively connecting said shafts in a given position of said carrier with respect to said driving shaft, a cutter on one of said shafts, a cutter on the other shaft so arranged with respect to said first-mentioned cutter that the cutting edges of both cutters are registering, an annular resilient pad on said blank-supporting shaft and comprising an inner ring, resilient means on said inner ring, and an outer ring placed on said resilient means and adapted to be engaged by the cutter on the other shaft.

4. A tube-cutting machine comprising a frame, a driving shaft in said frame, a rocking carrier fulcrumed on said frame, a shaft supported on said carrier, one of said shafts being adapted to support a tube blank, means on said shafts for operatively connecting said shafts in a given position of said carrier with respect to said driving shaft, cutters on one of said shafts, cutters on the other shaft so arranged with respect to said first-mentioned cutters that the cutting edges of each two cutters on either shaft are registering, and annular resilient pads adjacent the cutters on said blank-supporting shaft and adapted to be engaged by the cutters on the other shaft.

5. A tube-cutting machine comprising a frame, a driving shaft in said frame, a rocking carrier fulcrumed on said frame, a shaft supported on said carrier, one of said shafts being adapted to support a tube blank, means on said shafts for operatively connecting said shafts in a given position of said carrier with respect to said driving shaft, cutters on one of said shafts, cutters on the other shaft so arranged with respect to said first-mentioned cutters that the cutting edges of each two cutters on either shaft are registering, and annular resilient pads adjacent the cutters on said blank-supporting shaft and adapted to be engaged by the cutters on the other shaft, the width of each cutter and its corresponding pad being equal to half the length of the tubes cut from said tube blank.

6. A tube-cutting machine comprising a frame, a driving shaft in said frame, a rocking carrier fulcrumed on said frame, a shaft supported on said carrier, one of said shafts being adapted to support a tube blank, means on said shafts for operatively connecting said shafts in a given position of said carrier with respect to said driving shaft, cutters on one of said shafts, cutters on the other shaft so arranged with respect to said first-mentioned cutters that the cutting edges of each two cutters on either shaft are registering, annular resilient pads adjacent the cutters on said blank-supporting shaft and adapted to be engaged by the cutters on the other shaft, and distance washers between said pads on said blank-supporting shaft, and between said cutters on said other shaft.

7. A tube-cutting machine comprising a frame, a driving shaft in said frame, a rocking carrier fulcrumed on said frame, a shaft supported on said carrier, one of said shafts being adapted to support a tube blank, means on said shafts for operatively connecting said shafts in a given position of said carrier with respect to said driving shaft, a cutter on one of said shafts, a cutter on the other shaft so arranged with respect to said first-mentioned cutter that the cutting edges of both cutters are registering, an annular resilient pad on said blank-supporting shaft adapted to be engaged by the cutter on the other shaft, and rollers carried in the frame of said machine and adapted to exert pressure on the blank on said blank-supporting shaft along a generatrix.

8. A tube-cutting machine comprising a frame, a driving shaft in said frame, a rocking carrier fulcrumed on said frame, a shaft supported on said carrier, one of said shafts being adapted to support a tube blank, means on said shafts for operatively connecting said shafts in a given position of said carrier with respect to said driving shaft, a cutter on one of said shafts, a cutter on the other shaft so arranged with respect to said first-mentioned cutter that the cutting edges of both cutters are registering, an annular resilient pad on said blank-supporting shaft adapted to be engaged by the cutter on the other shaft, and adjustable rollers carried in the frame of said machine and adapted to exert pressure on the blank on said blank-supporting shaft along a generatrix.

In testimony whereof we affix our signatures.

OTTO GLÄSSER.
ERNST FLEMNITZ.